(12) United States Patent
Cadoret et al.

(10) Patent No.: US 12,720,155 B2
(45) Date of Patent: Aug. 25, 2026

(54) DETECTING BLACK BARS IN VIDEO CONTENT

(71) Applicant: SIGNIFY HOLDING B.V., Eindhoven (NL)

(72) Inventors: Bruno Cadoret, Quebec (CA); Aloys Hubbers, Doetinchem (NL); Judocus Nicolaas Pulles, Hapert (NL); Jorge Gabriel Squillace, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/121,158

(22) PCT Filed: Oct. 23, 2023

(86) PCT No.: PCT/EP2023/079455

§ 371 (c)(1),
(2) Date: Apr. 15, 2025

(87) PCT Pub. No.: WO2024/088953

PCT Pub. Date: May 2, 2024

(65) Prior Publication Data

US 2026/0136064 A1 May 14, 2026

Related U.S. Application Data

(60) Provisional application No. 63/418,700, filed on Oct. 24, 2022.

(30) Foreign Application Priority Data

Jan. 5, 2023 (EP) .................................... 23150396

(51) Int. Cl.

| | |
|---|---|
| ***H04N 21/44*** | (2011.01) |
| ***H04N 21/41*** | (2011.01) |
| ***H05B 47/105*** | (2020.01) |

(52) U.S. Cl.
CPC ... *H04N 21/44008* (2013.01); *H04N 21/4131* (2013.01); *H05B 47/105* (2020.01)

(58) Field of Classification Search
CPC ......... H04N 21/44008; H04N 21/4131; H05B 47/105
See application file for complete search history.

(56) References Cited

U.S. PATENT DOCUMENTS

| | | | | |
|---|---|---|---|---|
| 10,771,835 | B1 * | 9/2020 | Chong | H04N 21/43615 |
| 2018/0005387 | A1 * | 1/2018 | Lee | H04N 19/182 |
| 2020/0007924 | A1 * | 1/2020 | Wu | H04N 21/2743 |

FOREIGN PATENT DOCUMENTS

| | | | |
|---|---|---|---|
| WO | 2021239560 | A1 | 12/2021 |
| WO | 2022058282 | A1 | 3/2022 |

* cited by examiner

*Primary Examiner* — Kyu Chae

(57) ABSTRACT

A system for controlling a plurality of lighting units to render light effects determined based on video content to accompany a rendering of said video content on a display is disclosed. The system comprises at least one output interface and at least one processor, which is configured to: position a first analysis area of a predefined number of analysis areas at an initial position in said video content, extract a first color from said video content at said initial position, reposition said first analysis area with respect to said video content to one or more subsequent positions in said video content and extract one or more subsequent colors from said video content at said respective one or more subsequent positions, determine a presence of a black bar in said video content based on said first color and/or said one or more subsequent colors, determine an area in said video content based on said first color and/or said one or more subsequent colors, which area comprises said black bar, determine positions for a subset of analysis areas of said predefined number of analysis areas outside said area comprising said black bar, extract (Continued)

one or more colors from one or more of said analysis areas of said subset, determine said light effects based on said extracted one or more colors, and control, via said at least one output interface, said plurality of lighting units to render said light effects.

10 Claims, 5 Drawing Sheets

DETECTING BLACK BARS IN VIDEO CONTENT

CROSS-REFERENCE TO PRIOR APPLICATIONS

This application is the U.S. National Phase application under 35 U.S.C. § 371 of International Application No. PCT/EP2023/079455, filed on Oct. 23, 2023, which claims the benefit of European Patent Application No. 23150396.2, filed on Jan. 5, 2023, and U.S. Provisional Application No. 63/418,700, filed on Oct. 24, 2022. These applications are hereby incorporated by reference herein.

FIELD OF THE INVENTION

The invention relates to a system for controlling a plurality of lighting units to render light effects determined based on video content to accompany a rendering of said video content on a display.

The invention further relates to a method of controlling a plurality of lighting units to render light effects determined based on video content to accompany a rendering of said video content on a display.

The invention also relates to a computer program product enabling a computer system to perform such a method.

BACKGROUND OF THE INVENTION

In order to create a more immersive entertainment experience, systems may be used which are able to control lighting units to change light depending on video and/or audio content. In other words, the lighting units are controlled to render entertainment light effects. An example of such a system is the Hue system in which the immersive entertainment experience can be created by a Hue (HDMI) Sync box or by a desktop PC (Hue Sync PC desktop app). In these systems, the audio and/or video is analyzed, and the light rendered by a group of lighting units changes depending on the analyzed content.

When lighting units are controlled based on video content, analysis areas are often used to ensure that different lighting units render different colors, e.g. such that a lighting unit to the left of a TV renders a color extracted from a left part of the video content and a lighting unit to the right of the TV renders a color extracted from a right part of the video content. For example, WO 2021/239560 discloses that different lighting units are mapped to different spatial areas (referred to as analysis regions) of the video content. In the method disclosed in WO 2021/239560, the size and/or location of an analysis region are determined based on the distance between the light source and a surface, e.g. wall, to increase the blending of the rendered colors when light sources are positioned near the surface.

The Hue sync box also uses analysis regions and the current Hue sync box extracts thousands of colors from thousands of small analysis areas in these analysis regions. However, if the analysis would be performed on a device which has limited resources or allocates limited resource to this task, the number of analysis areas would need to be reduced, e.g. to a couple of small analysis areas per analysis region. Without additional measures, this would often result in poor light effects, e.g. flickering.

SUMMARY OF THE INVENTION

The inventors have realized that when video content contains black bars (e.g. horizontal or vertical), these need to be detected in order to provide light effects that are based on the actual video content and not based on the black colors of the black bars. However, with limited resources black bar detection requires proper resource allocation for such detection. Furthermore, the size and/or the location of the black bars may differ per video, or even per scene of a single video.

It is therefore an object to provide a system, which is able to detect black bars in video content with limited resources to provide attractive light effects.

According to a first aspect, the object is achieved by a system for controlling a plurality of lighting units to render light effects determined based on video content to accompany a rendering of said video content on a display. The system comprises at least one output interface and at least one processor, which is configured to:

- position a first analysis area of a predefined number of analysis areas at an initial position in said video content,
- extract a first color from said video content at said initial position,
- reposition said first analysis area with respect to said video content to one or more subsequent positions in said video content and extract one or more subsequent colors from said video content at said respective one or more subsequent positions,
- determine a presence of a black bar in said video content based on said first color and/or said one or more subsequent colors,
- determine an area in said video content based on said first color and/or said one or more subsequent colors, which area comprises said black bar,
- determine positions for a subset of analysis areas of said predefined number of analysis areas outside said area comprising said black bar,
- extract one or more colors from one or more of said analysis areas of said subset,
- determine said light effects based on said extracted one or more colors, and
- control, via said at least one output interface, said plurality of lighting units to render said light effects.

The predefined quantity of analysis areas, e.g. 16, is typically the maximum quantity. This restriction may be imposed due to limited resources. By repositioning the first analysis area and by extracting and analyzing colors from one or more subsequent positions of the first analysis area, the position of the black bar is detected, and colors are extracted from other analysis areas not located in the black bar area. The at least one processor may be configured to iteratively repeat the repositioning until a location of the area comprising the black bar has been determined. Repositioning the first analysis area is beneficial because it enables (real-time) black bar detection with limited resources to provide (attractive) light effects based on the actual video content (and not based on the black bars).

Said initial position may be a position located substantially at an edge of said video content. The edge may, for example, be a horizontal upper or lower edge or one of the vertical side edges. Alternatively, the edge may be a vertical edge. This enables quick determination if a black bar is present with limited resources, because black bars are typically located at the edges of the video content.

Said at least one processor may be configured to reposition said first analysis area based on a respective extracted color (i.e. the first color and/or respective subsequent colors). For instance, said at least one processor may be configured to reposition said first analysis area towards an edge of said video content if a respective extracted color is not black, and/or be configured to reposition said first analysis area away from an edge of said video content if a respective extracted color is black. The at least one processor may be configured to iteratively repeat this process for each subsequent position until a location of the area comprising the black bar has been determined.

Said at least one processor may be configured to reposition said first analysis area with respect to said video content to said one or more subsequent positions in said video content for respective subsequent moments in said video content. Thus, the first analysis area may be repositioned in an adaptive manner for different scenes, frames or shots of the video content.

Said initial position may be a predefined initial position. For instance, the initial position may be a predefined location at or nearby a horizontal/vertical edge of the video content. The predefined location may, for example, be a location at predefined pixel coordinates, a predefined distance from an edge, a percentage from the horizontal and/or vertical edge of the video content, etc.

Said at least one processor may be configured to determine said initial position based on metadata of said video content. This is beneficial, because by using this information the locations of black bars can be determined faster with less resources.

Said at least one processor may be configured to:

- infer, based on the presence of the black bar, that a second black bar is present at an opposite side of the video content,
- determine a second area in said video content, which second area comprises said second black bar, and
- determine positions for the subset of analysis areas of said predefined number of analysis areas outside said area comprising said black bar and outside said second area comprising said second black bar. Said at least one processor may be configured to determine the presence of a first black bar in the video content, and based thereon infer that a second black bar is also present at an opposite side (e.g. an opposite edge) of the video content. Typically, video content has two black bars (either vertical or horizontal), so detection of a single black bar and inferring the presence of a second black bar is beneficial, because it reduces the required resources for black bar detection.

Said at least one processor may be further configured to: (i) determine that no horizontal black bar is present based on said first color and/or said one or more colors, and to sequentially reposition said first analysis area of the to determine if a vertical black bar is present, and/or (ii) determine that no vertical black bar is present based on said first color and/or said one or more colors, and to sequentially reposition said first analysis area of the to determine if a horizontal black bar is present. This enables detection of vertical and horizontal black bars with limited amount of resources.

The system may comprise at least one input interface. Said at least one processor may be configured to obtain, via said at least one input interface, for each respective lighting unit of said plurality of lighting units, a position relating to said respective lighting unit, said position being a position of said respective lighting unit relative to said display or of a light effect created by said respective lighting unit relative to said display, and determine said positions of said subset of analysis areas based on said positions of said plurality of lighting units.

Said at least one processor may be configured to determine a first position for an analysis area of said subset of analysis areas at a first moment in said video content and a second position for said analysis area at a second moment in said video content. Thus, the limited number of analysis areas may be distributed in an adaptive manner, e.g. based on the video content. Certain analysis area positions may be very suitable for a first scene or shot of the video content and other analysis area positions may be very suitable for a second scene or shot of the video content.

According to a second aspect, the object is achieved by a method of controlling a plurality of lighting units to render light effects determined based on video content to accompany a rendering of said video content on a display, said method comprising:

- positioning a first analysis area of a predefined number of analysis areas at an initial position in said video content,
- extracting a first color from said video content at said initial position,
- repositioning said first analysis area with respect to said video content to one or more subsequent positions in said video content and extracting one or more subsequent colors from said video content at said respective one or more subsequent positions,
- determining a presence of a black bar in said video content based on said first color and/or said one or more subsequent colors,
- determining an area in said video content based on said first color and/or said one or more subsequent colors, which area comprises said black bar,
- determining positions for a subset of analysis areas of said predefined number of analysis areas outside said area comprising said black bar,
- extracting one or more colors from one or more of said analysis areas of said subset;
- determining said light effects based on said extracted one or more colors; and
- controlling said plurality of lighting units to render said light effects.

According to a third aspect, the object is achieved by a computer program product for a computing device, the computer program product comprising computer program code to perform the method when the computer program product is run on a processing unit of the computing device.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
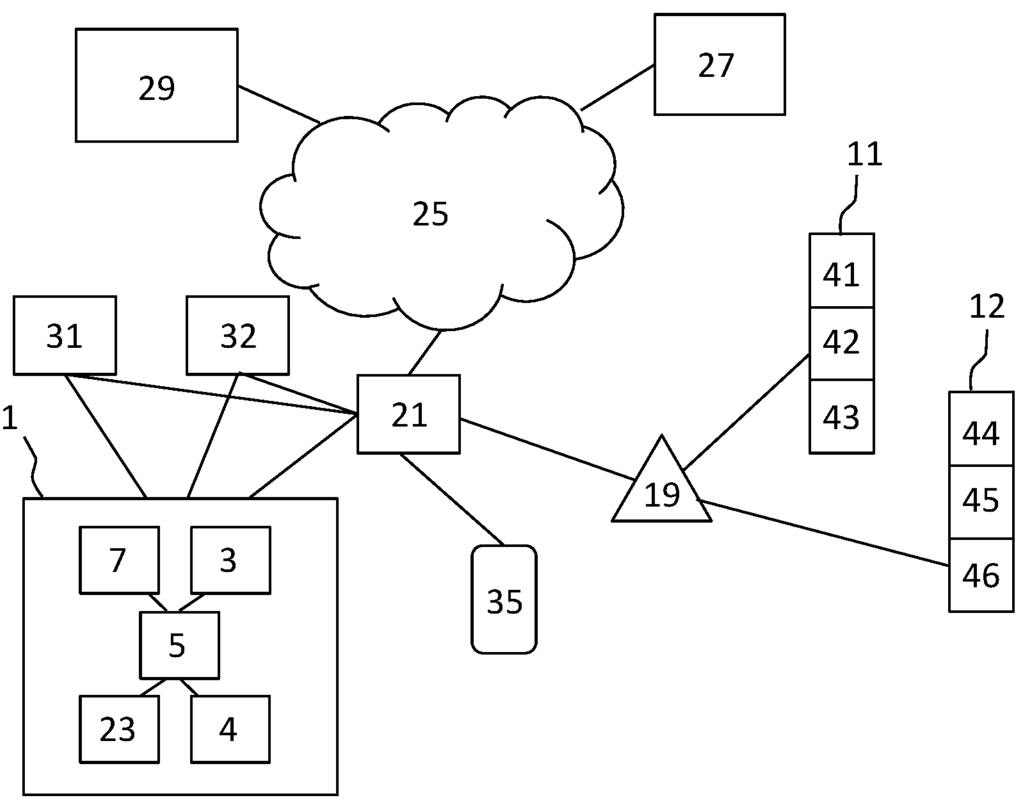
FIG. 1 is a block diagram of a first example of the system.

FIG. 1 shows a first example of the system for controlling a plurality of lighting units to render light effects determined based on video content to accompany a rendering of the video content on a display. In the first example of FIG. 1, the system is a display device, e.g. a smart TV.

In the example of FIG. 1, the display device 1 can control lighting devices 11 and 12 via a bridge 19. Lighting control may be performed by an app running on display device 1, for example. Lighting device 11 comprises light sources/pixels 41-43 and lighting device 12 comprises light sources/pixels 44-46. The light sources 41-46 may each comprise one or more LEDs, for example. The bridge 19 may be a Hue bridge, for example. The bridge 19 communicates with the lighting devices 11 and 12, e.g., using Zigbee technology. The display device 1 is connected to a wireless LAN access point 21, e.g., via Wi-Fi. The bridge 19, local media receivers 31 and 32, and a mobile device 35 are also connected to the wireless LAN access point 21, e.g., via Wi-Fi or Ethernet.

Alternatively or additionally, the display device 1 may be able to communicate directly with the bridge 19, e.g. using Zigbee technology, and/or may be able to communicate with the bridge 19 via the Internet/cloud, e.g. via Internet server 29. Alternatively or additionally, the display device 1 may be able to control the lighting devices 11 and 12 without a bridge, e.g. directly via Wi-Fi, Bluetooth or Zigbee or via the Internet/cloud.

The wireless LAN access point 21 is connected to the Internet 25. A media server 27 is also connected to the Internet 25. Media server 27 may be a server of a video-on-demand service such as Netflix, Amazon Prime Video, Hulu, Disney+, or Apple TV+, for example. The display device 1 is connected to local media receivers 31 and 32 via HDMI. The local media receivers 31 and 32 may comprise one or more streaming or content generation devices, e.g., an Apple TV, Microsoft Xbox and/or Sony Play Station, and/or one or more cable or satellite TV receivers. In an alternative example, media receiver 31 and/or 32 is/are comprised in the display device.

The display device 1 comprises a receiver 3, a transmitter 4, a processor 5, memory 7, and a display 23. The processor 5 is configured to obtain, via the receiver 3, for each respective light source of the light sources 41-46, a position relating to the respective light source. The position is a position of the respective light source relative to the display 23 or of a light effect created by the respective light source relative to the display 23. These positions may be obtained automatically, e.g. by using RF beacons and/or by analyzing one or more camera images, or may be entered by a person, e.g. on mobile device 35 or in a floor plan or Building Information Model (BIM).

The processor 5 is further configured to determine positions of a predefined number of analysis areas based on the positions of the light sources 41-46, extract a color from each of the predefined number of analysis areas, determine the light effects based on the extracted colors, and control, via the transmitter 4, the light sources 41-46 to render the light effects, e.g. by transmitting light commands to lighting devices 11 and 12. The predefined quantity of analysis areas, e.g. 16, is typically the maximum quantity. The processor 5 may also be configured to determine the positions of the predefined number of analysis areas further based on the video content.

In the example of the display device 1 shown in FIG. 1, the display device 1 comprises one processor 5. In an alternative example, the display device 1 comprises multiple processors. The processor 5 of the display device 1 may be a general-purpose processor, e.g. ARM-based, or an application-specific processor. The processor 5 of the display device 1 may run a Unix-based operating system for example. The memory 7 may comprise one or more memory units. The memory 7 may comprise solid-state memory, for example.

The receiver 3 and the transmitter 4 may use one or more wired or wireless communication technologies such as Zigbee to communicate with the bridge 19 and HDMI to communicate with local media receivers 31 and 32, for example. In an alternative example, multiple receivers and/or multiple transmitters are used instead of a single receiver and a single transmitter. In the example shown in FIG. 1, a separate receiver and a separate transmitter are used. In an alternative example, the receiver 3 and the transmitter 4 are combined into a transceiver. The display device 1 may comprise other components typical for a display device such as a power connector. The invention may be implemented using a computer program running on one or more processors.

In the example of FIG. 1, the system of the invention comprises a single device. In an alternative example, the system comprises multiple devices. In the example of FIG. 1, the system of the invention is a display device. In an alternative example, the system may be another device, e.g., a mobile device, laptop, personal computer, a bridge, an HDMI module, a streaming device, or an Internet server.

Figure 2:
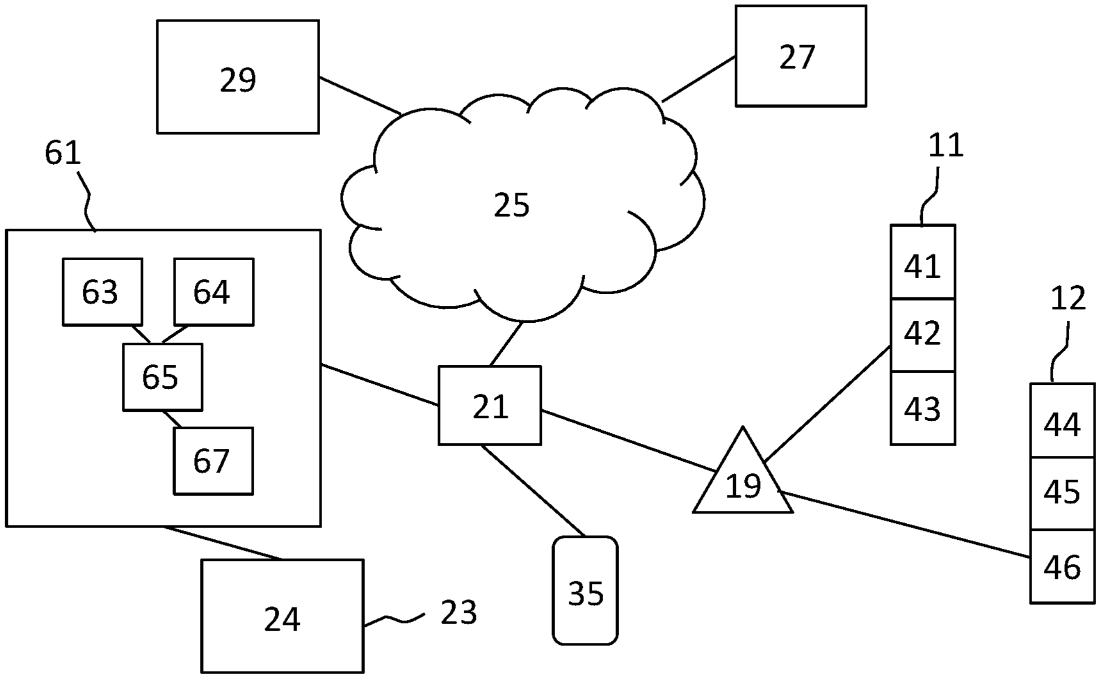
FIG. 2 is a block diagram of a second example of the system.

FIG. 2 shows a second example of the system for controlling a plurality of lighting units to render light effects determined based on video content to accompany a rendering of the video content on a display. In the second example of FIG. 2, the system is a personal computer 61.

The computer 61 comprises a receiver 63, a transmitter 64, a processor 65, and a memory 67. The processor 65 is configured to obtain, via the receiver 63, for each respective light source of the light sources 41-46, a position relating to the respective light source. The position is a position of the respective light source relative to the display 23 or of a light effect created by the respective light source relative to the display 23. These positions may be obtained automatically, e.g. by using RF beacons and/or by analyzing one or more camera images, or may be entered by a person, e.g. who is using a keyboard of the personal computer 61.

The processor 65 is further configured to determine positions of a predefined number of analysis areas based on the positions of the light sources 41-46, extract a color from each of the predefined number of analysis areas, determine the light effects based on the extracted colors, and control, via the transmitter 64, the light sources 41-46 to render the light effects, e.g. by transmitting light commands to lighting devices 11 and 12. The predefined quantity of analysis areas, e.g. 16, is typically the maximum quantity. The processor 65 may also be configured to determine the positions of the predefined number of analysis areas further based on the video content.

In the example of the computer 61 shown in FIG. 2, the computer 61 comprises one processor 65. In an alternative example, the computer 61 comprises multiple processors. The processor 65 of the computer 61 may be a general-purpose processor, e.g. from Intel or AMD, or an application-specific processor. The processor 65 of the computer 61 may run a Windows or Unix-based operating system for example. The storage means 67 may comprise one or more memory units. The memory 67 may comprise one or more hard disks and/or solid-state memory, for example. The memory 67 may be used to store an operating system, applications and application data, for example.

The receiver 63 and the transmitter 64 may use one or more wired and/or wireless communication technologies such as Ethernet and/or Wi-Fi (IEEE 802.11) to communicate with the wireless LAN access point 21, for example. In an alternative example, multiple receivers and/or multiple transmitters are used instead of a single receiver and a single transmitter. In the example shown in FIG. 2, a separate receiver and a separate transmitter are used. In an alternative example, the receiver 63 and the transmitter 64 are combined into a transceiver. The computer 61 may comprise other components typical for a computer such as a power connector. The invention may be implemented using a computer program running on one or more processors.

Figure 3A:
FIGS. 3*a* and 3*b* show different techniques for black bar detection in video content.
Figure 3A:
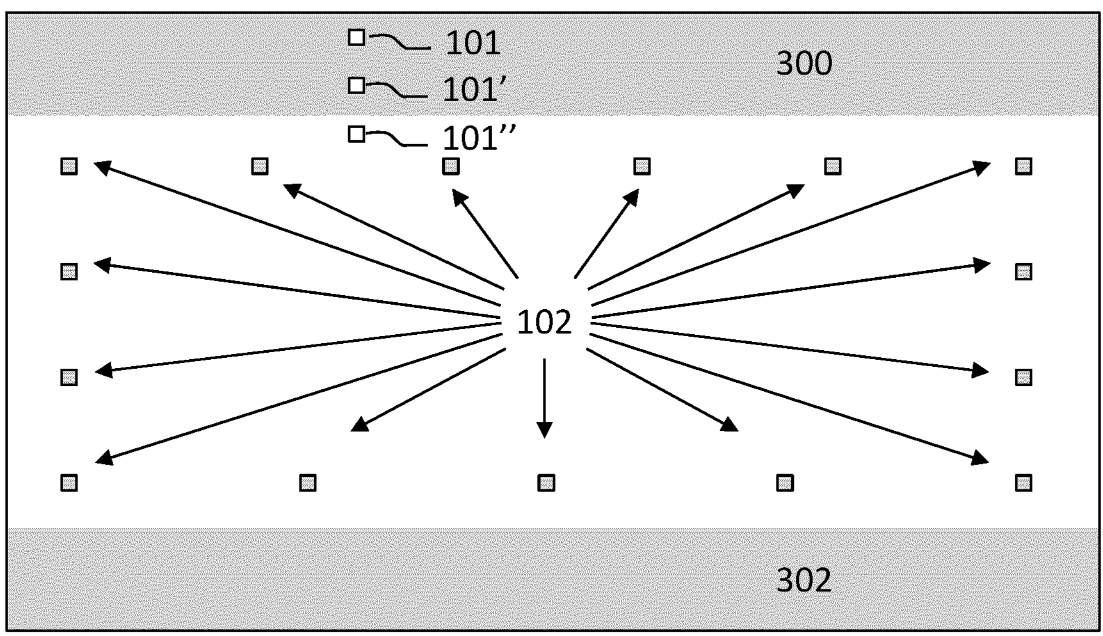
Figure 3B:
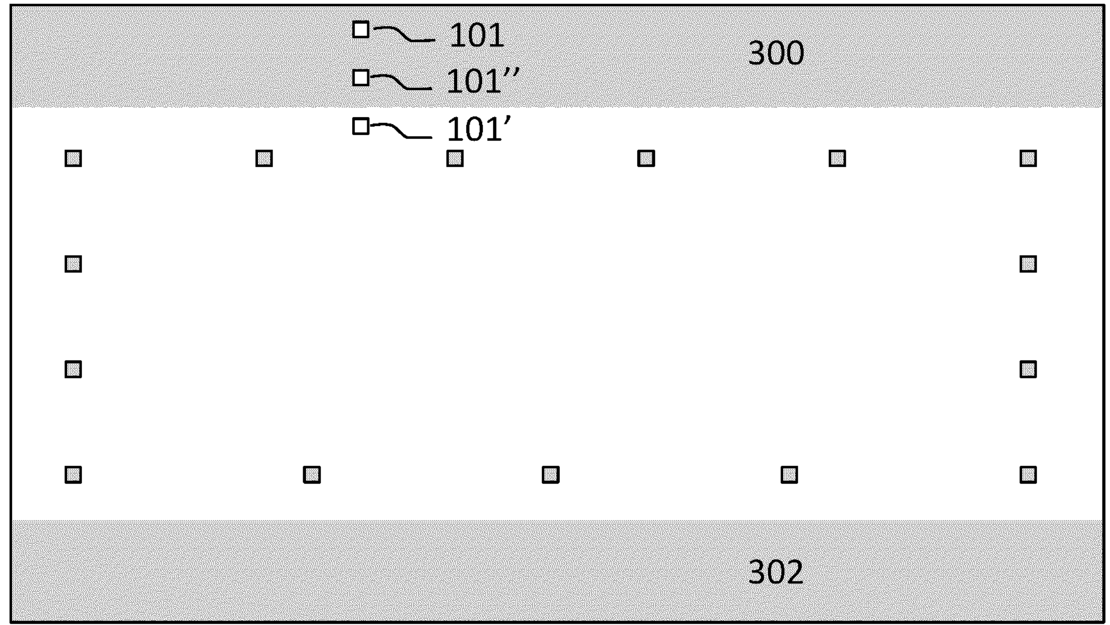

FIGS. 3*a* and 3*b* show different techniques for black bar detection in the video content. These Figures show The at least one processor 5,65 is configured to position a first analysis area 101 of a predefined number of analysis areas 101, 102 at an initial position (e.g. a set of (pixel) coordinates, indicated by reference numeral 101 in FIGS. 3*a* and 3*b*) in the video content. The predefined number of analysis areas 101, 102 may, for example, be areas comprising a (predefined) number of pixels. The at least one processor 5,65 is configured to extract a first color from said video content at said initial position 101. Thereafter, the at least one processor 5, 65 (sequentially) repositions the first analysis area 101 with respect to said video content to one or more subsequent positions 101', 101" in the video content and extracts one or more subsequent colors from the video content at the respective one or more subsequent positions 101', 101". Based on the extracted colors (the first color and/or the one or more subsequent colors) the at least one processor determines a presence (and a location) of a black bar in said video content.

Referring to FIG. 3*a*, the at least one processor 5, 65 may first position the first analysis area at position 101, extract a color (e.g. a black color) and subsequently reposition the first analysis area 101 to a first subsequent position 101' and extract a first subsequent color (e.g. black) at that first subsequent position. Based thereon, the at least one processor 5, 65 may reposition the first analysis area to a second subsequent position 101" and extract a second subsequent color (e.g. non-black, indicative of that the black bar is not present at the second subsequent position 101") at that second subsequent position 101". Based thereon, the at least one processor 5, 65 may determine the presence of the black bar 300 in the video content, and determine the height and therewith the area comprising the black bar 300. The repositioning may continue until the exact edge of the black bar has been detected. Alternatively, the repositioning may continue until an estimation (between positions 101' and 101") of the location of the black bar has been detected.

FIG. 3*b* shows another example, wherein the first analysis area is repositioned to converge to an (estimated) location of the edge of the black bar 300. The at least one processor 5, 65 may first position the first analysis area at position 101, extract a color (e.g. a black color) and subsequently reposition the first analysis area 101 to a first subsequent position 101' and extract a first subsequent color (e.g. e.g. non-black, indicative of that the black bar is not present at the second subsequent position 101") at that first subsequent position. Based thereon, the at least one processor 5, 65 may reposition the first analysis area to a second subsequent position 101" and extract a second subsequent color (e.g. black, indicative of that the black bar 300 is present at the second subsequent position 101") at that second subsequent position 101". Based thereon, the at least one processor 5, 65 may determine the presence of the black bar 300 in the video content, and determine the height and therewith the area comprising the black bar 300. The repositioning may continue until the (exact) edge of the black bar has been detected. Alternatively, the repositioning may continue until an estimation of the location of the black bar has been detected.

The at least one processor 5, 65 may be further configured to infer, based on the presence of the black bar 300, that a second black bar 302 is present at an opposite side of the video content. Alternatively, the at least one processor 5, 65 may use a second analysis area (not shown) for detection of a second black bar 302 in a manner similar to the detection of the (first) black bar. The at least one processor 5, 65 may be further configured to determine a second area in the video content, which second area comprises the second black bar 302, and determine the positions for the subset 102 of analysis areas of the predefined number of analysis areas outside the area comprising the black bar and outside the second area comprising the second black bar.

The at least one processor 5, 65 may be configured to reposition the first analysis area based on a respective extracted color (e.g. the first color and/or respective subsequent colors). For instance, the first analysis area may be positioned at a predefined distance from the edge of the video content, and the at least one processor 5, 65 may be configured to reposition the first analysis area towards the edge of said video content if a respective extracted color is not black. Additionally or alternatively, the at least one processor 5, 65 may be configured to reposition a first analysis area away from an edge of the video content if a respective extracted color is black (as exemplified in FIG. 3*a*). The at least one processor 5, 65 be configured to iteratively repeat this process for subsequent positions until a location of the area comprising the black bar 300 has been determined.

The at least one processor 5, 65 may be configured to reposition said first analysis area with respect to said video content to said one or more subsequent positions in said video content for respective subsequent moments in said video content. The repositioning may, for example, be performed for every frame, every set of frames, once every predefined time period (e.g. every 100 ms), etc.

The at least one processor 5, 65 may be configured to determine positions for a subset of analysis areas 102 (different from the first analysis area) of the predefined number of analysis areas 101, 102 outside the area comprising the black bar 300 (and the second black bar 302). FIG. 3*a* shows positioning of a subset of analysis areas 102 which have been positioned outside the area comprising the black bar 300.

The at least one processor 5, 65 is configured to extract a color from one or more of said analysis areas of said subset, and determine said light effects based on the one or more extracted colors. The at least one processor 5, 65 may, for example, extract one or more colors from an analysis area by analyzing the colors of the video content at that analysis area. The analysis areas may be individual pixels, or be areas comprising a predefined number of pixels (e.g. at least 5×5 pixels or 10×10 pixels). Techniques for extracting colors from video content are known in the art and will therefore not be discussed in further detail. The at least one processor 5, 65 then controls, via the at least one output interface (4,64), the plurality of lighting units (41-46,47-49,14) to render the light effects.

The initial position may be a predefined initial position. For instance, the initial position may be a predefined location at or nearby a horizontal/vertical edge of the video content. The predefined location may, for example, be a location at a predefined number of pixels, a predefined distance, a percentage, etc. from the horizontal and/or vertical edge of the video content. The at least one processor 5, 65 may be configured to determine the initial position based on metadata of the video content. The metadata may comprise information indicative of (approximate) locations of one or more black bars. The metadata may for example be indicative of: a resolution of the video content, indicative of locations of the black bars, a type of the video content, etc.

The at least one processor 5, 65 may determine the initial position for the first analysis area based thereon.

Figure 4:
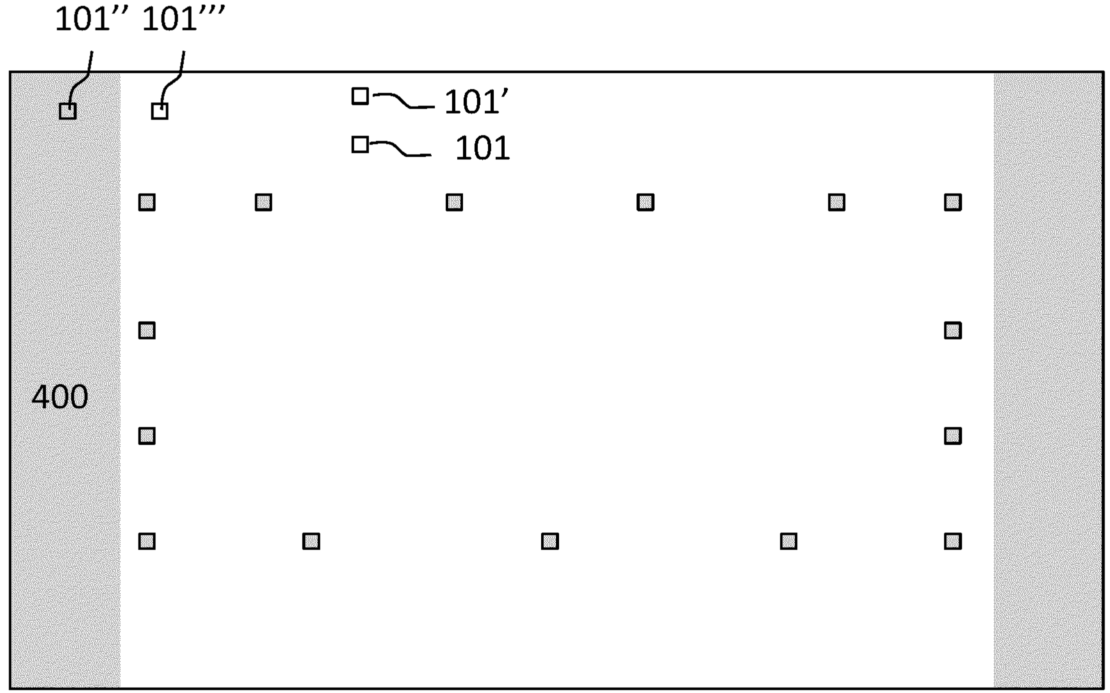
FIG. 4 shows an example of switching from horizontal black bar detection to vertical black bar detection.

The at least one processor may be further configured to: (i) determine that no horizontal black bar is present based on the first color and/or the one or more colors, and to sequentially reposition the first analysis area to determine if a vertical black bar is present, and/or (ii) determine that no vertical black bar is present based on the first color and/or the one or more colors, and to sequentially reposition the first analysis area to determine if a horizontal black bar is present. An example thereof has been illustrated in FIG. 4, which shows that the first analysis area 101 has been moved to a first subsequent position 101'. When no horizonal black bars are detected, the at least one processor 5, 65 may reposition the first analysis area to a second subsequent position 101", and thereafter to a third subsequent position 101'" to determine if a vertical black bar 400 is present (which may be performed in a similar way as the horizontal black bar 300 detection). The at least one processor 5, 65 may then position the subset of analysis areas 102 accordingly such that they are positioned outside the area covered by the (vertical) black bar 400.

The system may comprise at least one input interface 3, 63. The at least one processor 5, 65 may be configured to obtain, via said at least one input interface, for each respective lighting unit of said plurality of lighting units, a position relating to said respective lighting unit, said position being a position of said respective lighting unit relative to said display or of a light effect created by said respective lighting unit relative to said display, and determine said positions of said subset of analysis areas based on said positions of said plurality of lighting units. For instance, if the lighting device 11 with light sources 41, 42, and 43 is positioned left of the display 23 and the lighting device 12 with light sources 44, 45, and 46 is positioned right of the display 23, the subset of analysis areas 102 may be positioned at the left and the right of the video content (in an area not comprising the black bar(s) 300, 302, 400). For instance, if the lighting device 11 with light sources 41, 42, and 43 is positioned on above the display 23 and the lighting device 12 with light sources 44, 45, and 46 is positioned below the display 23, the subset of analysis areas 102 may be positioned at the top and the bottom of the video content (in an area not comprising the black bar(s) 300, 302, 400).

Figure 5:
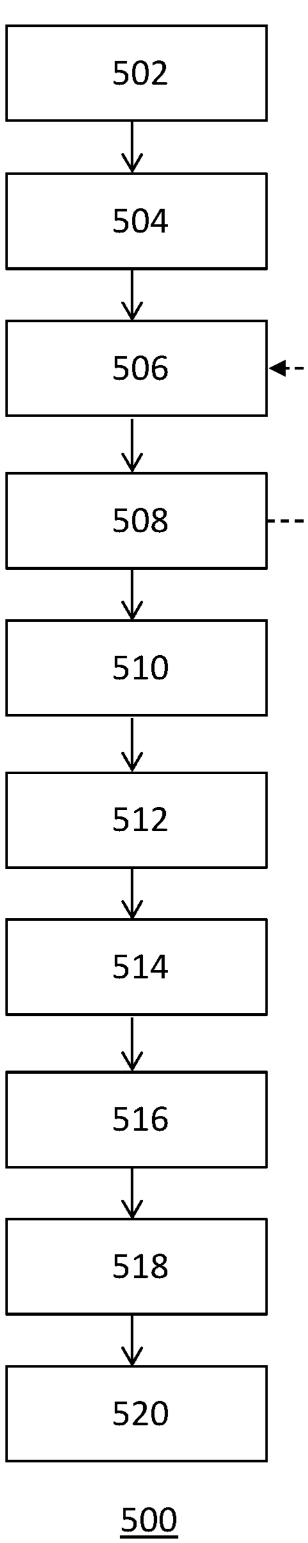
FIG. 5 shows a method of controlling a plurality of lighting units to render light effects determined based on video content to accompany a rendering of said video content on a display.

FIG. 5 shows schematically a method 500 of controlling a plurality of lighting units to render light effects determined based on video content to accompany a rendering of said video content on a display. The method comprises:

- positioning 502 a first analysis area of a predefined number of analysis areas at an initial position in said video content,
- extracting 504 a first color from said video content at said initial position,
- repositioning 506 said first analysis area with respect to said video content to one or more subsequent positions in said video content and extracting 508 one or more subsequent colors from said video content at said respective one or more subsequent positions,
- determining 510 a presence of a black bar in said video content based on said first color and/or said one or more subsequent colors,
- determining 512 an area in said video content based on said first color and/or said one or more subsequent colors, which area comprises said black bar,
- determining 514 positions for a subset of analysis areas of said predefined number of analysis areas outside said area comprising said black bar,
- extracting 516 one or more colors from one or more of said analysis areas of said subset;
- determining 518 said light effects based on said extracted one or more colors; and
- controlling 520 said plurality of lighting units to render said light effects.

Steps 506 and 508 may be performed multiple times, for instance until it has been determined that one or more black bars are/are not present, or until the locations of the one or more black bars have been (sufficiently) determined.

The method 500 may be executed by computer program code of a computer program product when the computer program product is run on a processing unit of a computing device, such as the at least one processor 5, 65 of the system 1, 61.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a plurality of lighting units to render light effects determined based on video content to accompany a rendering of said video content on a display, said system comprising:

at least one output interface; and at least one processor configured to:

position a first analysis area of a predefined number of analysis areas at an initial position in said video content, wherein said analysis areas each comprise an individual pixel or comprise a predefined number of pixels, extract a first color from said video content at said initial position by analyzing one or more colors of said video content at said first analysis area, iteratively reposition said first analysis area with respect to said video content to one or more subsequent positions in said video content and extract one or more subsequent colors from said video content at said respective one or more subsequent positions until a location of an area comprising a black bar has been determined, wherein said at least one processor is configured to reposition said first analysis area towards an edge of said video content if said first color is not black and reposition said first analysis area away from an edge of said video content if said first color is black, determine a presence of said black bar in said video content based on said first color and said one or more subsequent colors, determine said area comprising said black bar in said video content based on said first color and said one or more subsequent colors, determine positions for a subset of analysis areas of said predefined number of analysis areas outside said area comprising said black bar, extract one or more colors from one or more of said analysis areas of said subset, determine said light effects based on said extracted one or more colors, and control, via said at least one output interface, said plurality of lighting units to render said light effects.

2. The system as claimed in claim 1, wherein said initial position is a position located at an edge of said video content.

3. The system as claimed in claim 1, wherein said at least one processor is configured to reposition said first analysis area with respect to said video content to said one or more subsequent positions in said video content for respective subsequent moments in said video content.

4. The system as claimed in claim 1, wherein said initial position is a predefined initial position.

5. The system as claimed in claim 1, wherein said at least one processor is configured to determine said initial position based on metadata of said video content, wherein the metadata comprises information indicative of locations of one or more black bars.

6. The system as claimed in claim 1, wherein said at least one processor is configured to: infer, based on the presence of the black bar, that a second black bar is present at an opposite side of the video content, determine a second area in said video content, which second area comprises said second black bar, determine positions for the subset of analysis areas of said predefined number of analysis areas outside said area comprising said black bar and outside said second area comprising said second black bar.

7. The system as claimed in claim 1, wherein said at least one processor is further configured to: (i) determine that no horizontal black bar is present based on said first color and/or said one or more colors, and to sequentially reposition said first analysis area of the to determine if a vertical black bar is present, and (ii) determine that no vertical black bar is present based on said first color and/or said one or more colors, and to sequentially reposition said first analysis area of the to determine if a horizontal black bar is present.

8. The system as claimed in claim 1, further comprising at least one input interface, wherein said at least one processor is further configured to obtain, via said at least one input interface, for each respective lighting unit of said plurality of lighting units, a position relating to said respective lighting unit, said position being a position of said respective lighting unit relative to said display or of a light effect created by said respective lighting unit relative to said display, and determine said positions of said subset of analysis areas based on said positions of said plurality of lighting units.

9. A method of controlling a plurality of lighting units to render light effects determined based on video content to accompany a rendering of said video content on a display, said method comprising:

positioning a first analysis area of a predefined number of analysis areas at an initial position in said video content, wherein said analysis areas each comprise an individual pixel or comprise a predefined number of pixels, extracting a first color from said video content at said initial position by analyzing one or more colors of said video content at said first analysis area, iteratively repositioning said first analysis area with respect to said video content to one or more subsequent positions in said video content and extracting one or more subsequent colors from said video content at said respective one or more subsequent positions until a location of an area comprising a black bar has been determined, wherein said first analysis area is repositioned towards an edge of said video content if said first color is not black and wherein said first analysis area is repositioned away from an edge of said video content if said first color is black, determining a presence of said black bar in said video content based on said first color and said one or more subsequent colors, determining said area comprising said black bar in said video content based on said first color and said one or more subsequent colors, determining positions for a subset of analysis areas of said predefined number of analysis areas outside said area comprising said black bar, extracting one or more colors from one or more of said analysis areas of said subset;

determining said light effects based on said extracted one or more colors; and controlling said plurality of lighting units to render said light effects.

10. A computer program product for a computing device, the computer program product comprising computer program code to perform the method of claim 9 when the computer program product is run on a processing unit of the computing device.

* * * * *